United States Patent [19]
Thomas

[11] 3,709,833
[45] Jan. 9, 1973

[54] PROCESS FOR PREPARING HIGH PURITY SILICON OXIDE POROUS BEADS DOPED WITH SMALL QUANTITIES OF OTHER OXIDES

[75] Inventor: Ian M. Thomas, Temperance, Mich.
[73] Assignee: Owens-Illinois, Inc.
[22] Filed: Aug. 21, 1970
[21] Appl. No.: 66,060

[52] U.S. Cl. ..................252/448, 252/452, 252/454
[51] Int. Cl. .............................................B01j 11/44
[58] Field of Search...252/448, 454, 455 R, 449, 452

[56] References Cited

UNITED STATES PATENTS

| | | | |
|---|---|---|---|
| 3,015,620 | 1/1962 | Plank et al. | 252/452 X |
| 2,419,272 | 4/1947 | Marisic et al. | 252/448 |
| 2,921,839 | 1/1960 | Ritter | 252/448 |
| 3,245,918 | 4/1966 | Burzynski | 252/448 |
| 3,483,136 | 12/1969 | van der Plas et al. | 252/449 |

*Primary Examiner*—C. F. Dees
*Attorney*—Donald K. Wedding and E. J. Holler

[57] ABSTRACT

There is disclosed the preparation of high purity, high surface area, porous beads of silicon oxide doped with small quantities of other oxides, which preparation comprises hydrolyzing a silicon alkoxide dissolved in a hydroxyl containing organic solvent with less than a stoichiometric amount of water so as to provide a partially hydrolyzed intermediate product. The resulting partially hydrolyzed intermediate product is then treated with additional water and an immiscible non-polar organic medium so as to form a discontinuous phase of liquid partially hydrolyzed intermediate product dispersed in a continuous phase of organic medium. As a source of dopant oxide, a selected water soluble salt is added to the process at any convenient step prior to the next process step of pH adjustment, e.g. before, during, or after the partially hydrolyzing; before, during, or after the organic medium treatment. The dispersed intermediate product is then treated with a base and a quantity of water sufficient to hydrolyze any residual alkoxy groups in the dispersed intermediate product. The resulting mixture is stirred until the dispersed intermediate is converted to firm, hard, solid, porous beads of silicon oxide doped with at least one other oxide. The beads are typically recovered by filtration and evaporation of non-solid residues or by like method.

29 Claims, No Drawings

PROCESS FOR PREPARING HIGH PURITY SILICON OXIDE POROUS BEADS DOPED WITH SMALL QUANTITIES OF OTHER OXIDES

THE INVENTION

This invention relates to the preparation of high purity, porous, doped silicon oxide beads. More particularly, this invention relates to the preparation of homogeneous, ultra pure, solid, high surface area, porous silicon oxide beads containing small quantities of other selected oxides by the steps of:

I. hydrolyzing a silicon alkoxide dissolved in a polar solvent with a less than a stoichiometric quantity of water so as to prepare an intermediate product of partially hydrolyzed silicon alkoxide;

II. treating the product of step I with an additional quantity of water sufficient to make the intermediate product immiscible in a non-polar organic solvent and then adding an immiscible non-polar organic medium so as to form a mixture comprising a discontinuous phase of liquid partially hydrolyzed intermediate product dispersed in a continuous phase of organic medium; a soluble source of at least one other selected oxide ingredient being added to the solution or medium of steps I or II respectively;

III. adding a quantity of base to the mixture sufficient to adjust it to an alkaline pH and a further quantity of water sufficient to hydrolyze any residual alkoxy groups in the dispersed intermediate product;

IV. stirring the mixture until the dispersed intermediate product is converted to firm, hard, porous, solid silicon oxide beads doped with at least one other selected oxide;

V. and then recovering the beads from the mixture.

In accordance with the more specific practice of this invention, the hydrolysis of the silicon alkoxide in process step I is typically accomplished by reacting about 1 mole of a silicon alkoxide with about 0.3 to about 1.5 moles of water. Preferably the silicon alkoxide is hydrolyzed in step I with about 0.9 to 1 mole of water. The amount of water added in step II is such that the total water in steps I and II is no less than about 2.5 moles of water per mole of silicon alkoxide, preferably about 2.7 to about 3.5 moles of water. An additional quantity of water is then added in step III such that the total in the process is about 3 to 6 moles of water per mole of silicon alkoxide, preferably about 3.5 to 4.5.

The partial hydrolyzing of the silicon alkoxide in step I is preferably accomplished with heat, e.g., up to about 60° C, in the presence of a suitable hydrolysis catalyst such as a mineral acid, e.g., HCl, or a Lewis Acid catalyst comprising compounds of a transitional element such as Zr or Ti or compounds of a non-transitional element such as Al. These compounds are capable of promoting or accelerating hydrolysis of the silicon alkoxide.

The hydrolysis catalyst is used in a catalytic amount, generally about 1 to about 500 parts by weight per million parts by weight of silicon alkoxide.

The silicon alkoxide is selected from compounds of the formula $SiX_n y_{4-n}$ wherein X is hydrogen, phenyl, or alkyls of one to six carbons; $y$ is OR where R is an alkyl of one to six carbons; and $n$ is 0, 1, or 2.

The silicon alkoxide is dissolved in any suitable polar solvent, i.e., a compound having or capable of developing electrical charges typically hydroxyl containing organic solvents such as lower aliphatic alcohols containing less than 10 carbon atoms, e.g., methyl alcohol, ethyl alcohol, iso-propyl alcohol, etc.

In process step II, the immiscible non-polar organic medium is typically a non-polar solvent, i.e., a compound not capable of having or developing electrical charges such as hexane, heptane, octane, nonane, benzene, toluene, carbon tetrachloride.

In process step III, the mixture is adjusted to an alkaline pH range by any suitable organic or inorganic base. However, where a particular contamination such as alkali is undesirable, various bases will be avoided; e.g., the alkali bases such as NaOH, KOH, etc. Typical bases used in this invention include ammonia, ammonium hydroxide, and the organic amines, especially the alkylamines such as triethylamine.

In one highly preferred embodiment of this invention, a non-ionic emulsifier or surfactant is added to the mixture prior to the pH adjustment so as to enhance the uniformity of the subsequently formed solid, porous beads. Non-ionic emulsifiers and surfactants will not ionize in the mixture. Typical non-ionic surfactants include morpholine oleate, polyglycol fatty acid esters, diethylene glycol monostearate, ethylene oxide condensates of amides, alkylaryl polyether alcohols.

In step IV, vigorous stirring is usually preferred. Typically the solid, porous beads begin to form within 5 to 60 minutes and are hard within another 60 minutes.

The recovery of the beads in step V may be by any convenient means. Typically the beads are filtered off and then heated slowly to an elevated temperature, e.g., up to about 500° C, to evaporate or thermally decompose any organic residues and to dehydrate the product.

The source of selected oxide dopant, which is soluble in the solution is added before, during, or after either process step I or II, but before the pH adjustment of process step III. In one embodiment hereof, the soluble source is added in the hydrolyzing water of steps I and/or II. Other embodiments include addition of the soluble source with the polar solvent of step I, directly to the intermediate product of step I, with the immiscible organic medium of step II, and/or directly to the mixture of step II.

In the broad practice hereof, the silicon oxide beads are selectively doped with at least one metal oxide. Metal as used herein is defined as also comprising the metal-like elements, e.g., the metalloids.

Specific dopant metal oxides contemplated herein include the oxides of Al, Ga, In, Ti, Zr, Hf, V, Nb, Ta, B, P, Ge, Sn, Pb, Li, Na, K, Rb, Cs, Fr, Be, Mg, Ca, Sr, Ba, Ra, Fe, Co, Ni, Zn, Cd, Hg, Sc, Y, the rare earths (Lanthanide Series) La through Lu, inclusive, and the Actinide Series, especially Th.

Typically the soluble source of the metal oxide is a water soluble salt of the metal including, not by way of limitation acetates, sulfates, nitrates, bromates, bromides, chlorides, carbonates, selenates, etc. In one preferred embodiment hereof, there is used a water soluble acetate or nitrate.

In one specific embodiment hereof, the dopant oxide is selected from the rare earths. Illustrative examples of contemplated water-soluble, rare-earth salts are as follows:

Lathanum: acetate, bromate, bromide, chloride, nitrate, sulfate.

Cerium: acetate (cerous), bromate (cerous), chloride (cerous), nitrate (cerous and ceric basic), selenate (cerous), sulfate (cerous).

Praseodymium: acetate, bromate, chloride, selenate, sulfate.

Neodymium: acetate, bromate, bromide, chloride, nitrate, sulfate.

Samarium: acetate, bromate, chloride, sulfate.

Europium: sulfate, chloride, nitrate.

Gadolinium: acetate, bromide, chloride, nitrate, selenate, sulfate.

Terbium: chloride, nitrate, sulfate.

Dysprosium: acetate, bromate, chloride, nitrate, selenate, sulfate.

Erbium: chloride, nitrate, sulfate.

Thulium: chloride

Ytterbium: acetate, chloride, sulfate.

Lutetium: sulfate

In accordance with this invention, the water soluble metal salt can be added to the process in an amount sufficient to dope the resulting silicon oxide beads with a small effective amount of metal oxide; that is, this invention permits controllably doping of silica beads with small effective amounts in ranges below about 2 percent, e.g., of about 10 p.p.m. (parts per million by weight) to about 1 percent by weight of elemental metal ion based on the total weight of the silica beads and dopant metal oxide.

The oxide doped silica beads prepared by this invention are in the form of ultra pure, hard, firm, solid, porous, crystal clear, spherical beads varying in size from about 50 microns to about 500 microns with a B.E.T. surface area of about 500 to about 900 square meters per gram. The B.E.T. surface area measurement utilized krypton as the absorbing gas. B.E.T. refers to the Brunauer-Emmett Teller surface area measuring method described in the JOURNAL OF THE AMERICAN CHEMICAL SOCIETY, Vol. 60, page 309 (1938).

In accordance with the practice of the invention at bar, it has been further discovered that high purity, homogenous, oxide doped, silicon oxide beads can be prepared which contain less than 50 p.p.m. by weight, typically less than 10 p.p.m., of trace metal impurities such as alkali metal oxides.

The following example is intended to illustrate one of the best embodiments contemplated by the inventor in the practice of this invention.

EXAMPLE

Distilled ethyl silicate (208 grams: 1.0 mole) was dissolved in ethanol (150 ml). Water (18 grams: 1.0 mole) and a catalytic amount of 1N mineral acid (hydrochloric acid) (0.2 gram: approx. 20 p.p.m. by weight acid) were then added to the ethyl silicate-ethanol solution. The resulting clear solution was then heated slowly to about 60° C for 10 to 15 minutes so as to provide a partially hydrolyzed but soluble organosilicate in ethanol solution.

An additional 2.0 moles of water was added and the solution was then cooled to room temperature. This additional 2.0 moles of water contained 5 milliters of aqueous ceric ammonium nitrate previously prepared by dissolving 0.94 gram of ceric ammonium nitrate in 100 milliters of water (equivalent to 200 p.p.m. of Ce in the final product). A non-polar organic medium (heptane) was then added. The solution became a two-phase mixture of small partially hydrolyzed organosilicate liquids dispersed in a heptane medium. A further 1.0 mole of water was added, the water containing a sufficient quantity of triethylamine to adjust the mixture pH to an alkaline range of about 9.0.

Any suitable alkaline pH may be used. However, the process rate of reaction typically increases with increased pH.

The mixture was stirred vigorously for about 30 minutes and solid beads began to form. Within 60 more minutes the beads had hardened.

The resulting beads were filtered off and heated slowly to 500° C to remove organic residues and to dehydrate the product. A quantitative yield of $SiO_2$ was obtained in the form of crystal clear, spherical beads varying in size from about 50 microns to 500 microns. The surface area (B.E.T. method) was 500–700 square meters per gram.

An emission spectrographic analysis of the resulting material gave an elemental Ce analysis of 193 ± 10 p.p.m. (parts per million by weight) plus the following results also in p.p.m.:

| Fe | 0.9 p.p.m. | Rb | 0.2 | Ni | 0.2 |
|---|---|---|---|---|---|
| Mg | 1.1 | Ba | 0.8 | Mo | 0.2 |
| Al | 2.2 | Be | 0.2 | Cu | 0.2 |
| Ca | 2.0 | Mn | 0.2 | Zn | 2.0 |
| Ti | 0.5 | Sb | 1.5 | Zr | 0.2 |
| Na | 0.5–5.0 | Pb | 0.4 | Sn | 0.2 |
| Li | 0.1–1.0 | Cr | 0.2 | | |
| K | 0.4–4.0 | As | 5.0 | | |

The foregoing spectrographic results illustrate the product high purity obtained by the practice of this invention. X-ray analysis indicated that the product was amorphous.

I claim:

1. A process for preparing solid, amorphous silicon oxide beads doped with about 10 p.p.m. by weight to about 1 percent by weight elemental metal in the form of metal oxide based on a total weight of the silicon oxide and metal oxide and having a B.E.T. surface area of about 500 to about 900 square meters per gram and a mean diameter of about 50 microns to about 500 microns, and containing less than 50 p.p.m. by weight of trace metal impurities including alkali metals, said process comprising:

I. hydrolyzing a silicon alkoxide dissolved in a polar solvent with less than a stoichiometric quantity of water so as to prepare an intermediate product of partially hydrolyzed silicon alkoxide, said quantity of water ranging between about 0.3 and 1.5 mols per mol of silicon alkoxide;

II. hydrolyzing the product of step I with an additional quantity of water sufficient to make the intermediate product immiscible in a non-polar organic solvent, the total quantity of water added in steps I and II being no less than 2.5 mols per mol of silicon alkoxide, and then treating the resulting product with an immiscible, non-polar organic medium so as to form a mixture comprising a discontinuous phase of liquid partially hydrolyzed intermediate product dispersed in a continuous phase of organic medium; a source of at least one selected metal oxide being added to the solution or mixture of steps I or II, said metal oxide source being soluble in said solution or mixture;

III. adding a quantity of base to the mixture sufficient to adjust it to an alkaline pH and a quantity of water sufficient to hydrolyze any residual alkoxy groups in the dispersed intermediate product, the total amount of water added in steps I, II and III being about 3 mols to about 6 mols per mol of silicon alkoxide;

IV. stirring the mixture until the dispersed intermediate product is converted to firm, hard, solid, porous silicon oxide beads;

V. and then recovering the beads from the mixture.

2. The process of claim 1 wherein the silicon alkoxide is selected from compounds of the formula $SiX_n y_{4-n}$ wherein X is hydrogen, phenyl, or alkyls of one to six carbons; y is OR where R is an alkyl of one to six carbons; and n is 0, 1, or 2.

3. The process of claim 1 wherein the silicon alkoxide is hydrolyzed in step I in the presence of a catalytic amount of a hydrolysis catalyst.

4. The process of claim 1 wherein the silicon alkoxide is tetraethylorthosilicate.

5. The process of claim 1 wherein the silicon alkoxide is tetramethylorthosilicate.

6. The process of claim 1 wherein the soluble source is a soluble salt of a rare earth.

7. The process of claim 6 wherein the base in step III is selected from ammonia, ammonium hydroxide, and organic amines.

8. The process of claim 7 wherein a non-ionic emulsifier is added to the mixture prior to the pH adjustment so as to enhance the uniformity of the subsequently formed solid, porous beads.

9. As a composition of matter, an ultra pure, hard, firm, solid, porous, clear, amorphous silicon oxide bead having a mean diameter of about 50 microns to about 500 microns and a B.E.T. surface area of about 500 to about 900 square meters per gram and doped with about 10 p.p.m. by weight to about 1 percent by weight elemental metal in the form of metal oxide based on the total weight of the silicon oxide and metal oxide, said doped silicon oxide bead containing less than 50 p.p.m. by weight of trace metal impurities including alkali metals.

10. The process of claim 1 wherein the total amount of water per mol of silicon alkoxide is between about 3.5 and 4.5 mols.

11. The process of claim 1 wherein the total amount of water per mol of silicon alkoxide used in step I is between about 0.9 and 1 mol.

12. The process of claim 1 wherein the total amount of water per mol of silicon alkoxide in steps I and II combined is between about 2.7 and 3.5 mols.

13. The process of claim 1 wherein the silicon alkoxide is hydrolyzed in step I at a temperature up to about 60° C.

14. The process of claim 3 wherein the hydrolysis catalyst is a mineral acid.

15. The process of claim 14 wherein the mineral acid is hydrochloric acid.

16. The process of claim 3 wherein the hydrolysis catalyst is a Lewis Acid Catalyst.

17. The process of claim 16 wherein, the Lewis Acid Catalyst comprises compounds of a transitional element consisting of Zr or Ti.

18. The process of claim 16 wherein the Lewis Acid Catalyst comprises compounds of the non-transitional element Al.

19. The process of claim 3 wherein the catalytic amount of hydrolysis catalyst is between about 1 and about 500 parts by weight per million parts by weight of silicon alkoxide.

20. The process of claim 1 wherein said hydroxyl containing organic solvent is a lower aliphatic alcohol containing less than 10 carbon atoms.

21. The process of claim 1 wherein said non-polar solvent is hexane, heptane, octane, nonane, benzene, toluene or carbon tetrachloride.

22. The process of claim 7 wherein said organic amines comprise alkyl amines.

23. The process of claim 22 wherein said alkyl amines include triethylamine.

24. The process of claim 8 wherein said non-ionic emulsifier is morpholine oleate, polyglycol, fatty acid esters, diethylene glycol monostearate, ethylene oxide condensates of amides or alkylaryl polyether alcohols.

25. The process of claim 1 wherein said metal oxide is an oxide of Al, Ga, In, Ti, Zr, Hf, V, Nb, Ta, B, P, Ge, Sn, Pb, Li, Na, K, Rb, Cs, Fr, Be, Mg, Ca, Sr, Ba, Ra, Fe, Co, Ni, Zr, Cd, Hg, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk or Cf.

26. The process of claim 1 wherein said soluble source of the metal oxide is a metal acetate, sulfate, nitrate, bromate, bromide, chloride, carbonate, or selenate.

m 27. The process of claim 1 wherein said soluble source of a metal oxide is a water-soluble, rare earth salt taken from the following:

Rare Earth

| | |
|---|---|
| Lathanum | acetate, bromate, bromide, chloride nitrate, sulfate |
| Cerium | cerous acetate, cerous bromate, cerous chloride, cerous nitrate, ceric basic nitrate, cerous selenate, cerous sulfate |
| Praseodymium | acetate, bromate, chloride, selenate, sulfate |
| Neodymium | acetate, bromate, bromide, chloride, nitrate, sulfate |
| Samarium | acetate, bromate, chloride, sulfate |
| Europium | sulfate, chloride, nitrate |
| Gadolinium | acetate, bromide, chloride, nitrate, selenate, sulfate |
| Terbium | chloride, nitrate, sulfate |
| Dysprosium | acetate, bromate, chloride, nitrate, selenate, sulfate |
| Erbium | chloride, nitrate, sulfate |
| Thulium | chloride |
| Ytterbium | acetate, chloride, sulfate |
| Lutetium | sulfate. |

28. The composition of matter of claim 9 wherein said metal oxide is a rare earth oxide.

29. The composition of matter of claim 10 wherein said metal oxide is an oxide of Al, Ga, In, Ti, Zr, Hf, V, Nb, Ta, B, P, Ge, Sn, Pb, Li, Na, I, Rb, Cs, Fr, Be, Mg, Ca, Sr, Ba, Ra, Fe, Co, Ni, Zn, Cd, Hg, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk or Cf.

* * * * *